US012573675B2

(12) United States Patent
Cha

(10) Patent No.: US 12,573,675 B2
(45) Date of Patent: Mar. 10, 2026

(54) BATTERY MODULE SENSING UNIT AND MANUFACTURING METHOD THEREOF

(71) Applicant: LG ENERGY SOLUTION, LTD., Seoul (KR)

(72) Inventor: In Seok Cha, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 581 days.

(21) Appl. No.: 17/927,613

(22) PCT Filed: Oct. 25, 2021

(86) PCT No.: PCT/KR2021/015003
§ 371 (c)(1),
(2) Date: Nov. 23, 2022

(87) PCT Pub. No.: WO2022/092730
PCT Pub. Date: May 5, 2022

(65) Prior Publication Data
US 2023/0207909 A1     Jun. 29, 2023

(30) Foreign Application Priority Data

Oct. 26, 2020     (KR) ........................ 10-2020-0139426

(51) Int. Cl.
*H01M 10/48*          (2006.01)
*H01M 50/507*         (2021.01)
*H01M 50/519*         (2021.01)
(52) U.S. Cl.
CPC ......... *H01M 10/48* (2013.01); *H01M 50/507* (2021.01); *H01M 50/519* (2021.01)

(58) Field of Classification Search
CPC .. H01M 10/48; H01M 50/502; H01M 50/507; H01M 50/519
See application file for complete search history.

(56) References Cited

U.S. PATENT DOCUMENTS

| | | |
|---|---|---|
| 2015/0064516 A1 | 3/2015 | Swoish |
| 2015/0064524 A1 | 3/2015 | Noh et al. |
| 2016/0315356 A1 | 10/2016 | Moon et al. |
| 2019/0088918 A1 | 3/2019 | Goh et al. |
| 2019/0348720 A1 | 11/2019 | Oh et al. |
| 2019/0389318 A1 | 12/2019 | Lee et al. |
| 2020/0014005 A1 | 1/2020 | Lee et al. |
| 2020/0144580 A1 | 5/2020 | Hong et al. |
| 2020/0411924 A1 | 12/2020 | Yun |
| 2021/0313657 A1 | 10/2021 | Park et al. |

(Continued)

FOREIGN PATENT DOCUMENTS

| | | |
|---|---|---|
| CN | 105556318 A | 5/2016 |
| CN | 207779574 U | 8/2018 |
| CN | 109390536 A | 2/2019 |

(Continued)

*Primary Examiner* — James Lee
(74) *Attorney, Agent, or Firm* — Bryan Cave Leighton Paisner LLP

(57) ABSTRACT

The present invention relates to a battery module sensing unit having a simple structure, more particularly a battery module sensing unit including a sensing member (120), an FPCB (100) including the sensing member (120), a busbar frame (300) connected to the FPCB (100), and a busbar (200) coupled to the busbar frame (300), wherein the FPCB (100) and the busbar (200) are directly coupled to each other while overlapping each other.

13 Claims, 4 Drawing Sheets

(56)                 References Cited

U.S. PATENT DOCUMENTS

2022/0247004 A1      8/2022   Yun

FOREIGN PATENT DOCUMENTS

| | | | |
|---|---|---|---|
| CN | 111029516 | A | 4/2020 |
| CN | 111384347 | A | 7/2020 |
| JP | 2003-045409 | A | 2/2003 |
| JP | 2013-069491 | A | 4/2013 |
| JP | 2013225457 | | 10/2013 |
| JP | 2020514976 | | 5/2020 |
| JP | 2020518988 | | 6/2020 |
| KR | 10-2015-0026112 | A | 3/2015 |
| KR | 1020170066896 | A | 6/2017 |
| KR | 10-2018-0091325 | A | 8/2018 |
| KR | 10-2018-0099437 | A | 9/2018 |
| KR | 10-2018-0137746 | A | 12/2018 |
| KR | 10-2019-0071454 | A | 6/2019 |
| KR | 10-2150679 | A | 9/2020 |

【FIG. 1】
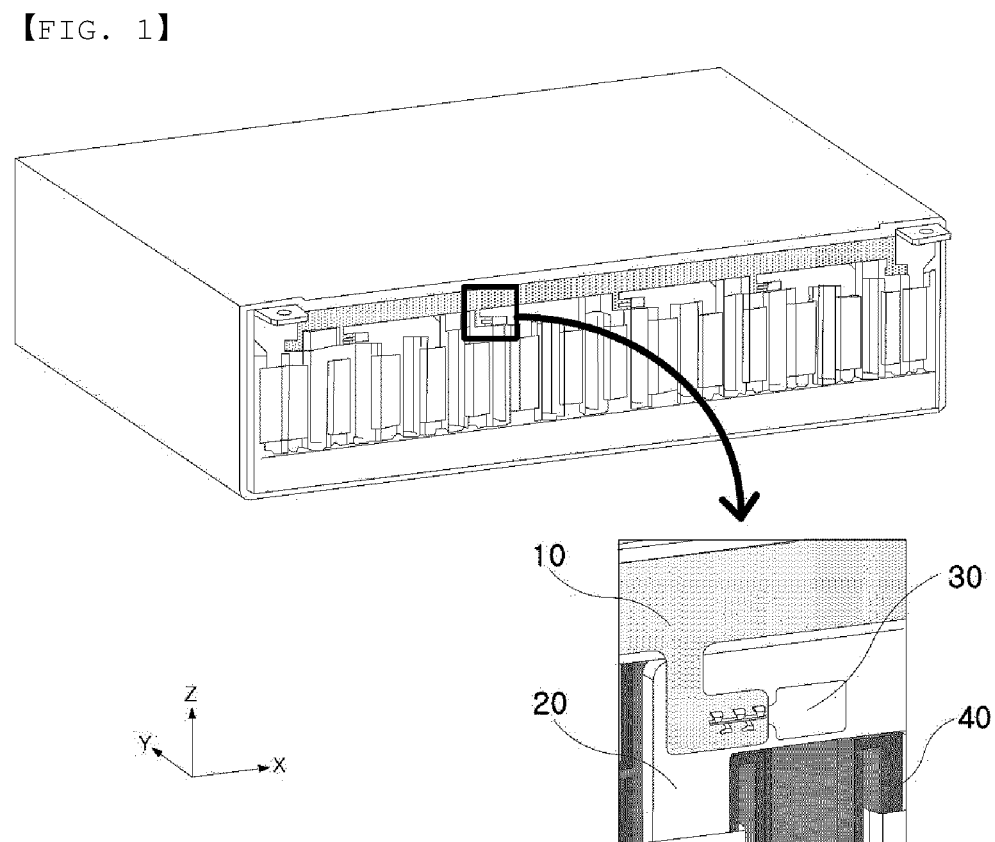

【FIG. 2】
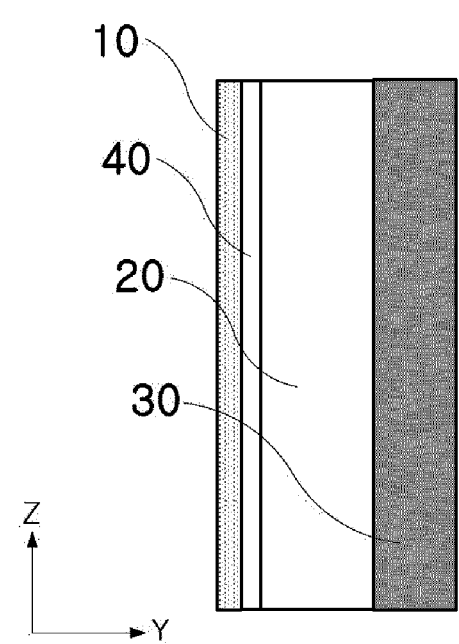
【FIG. 3】
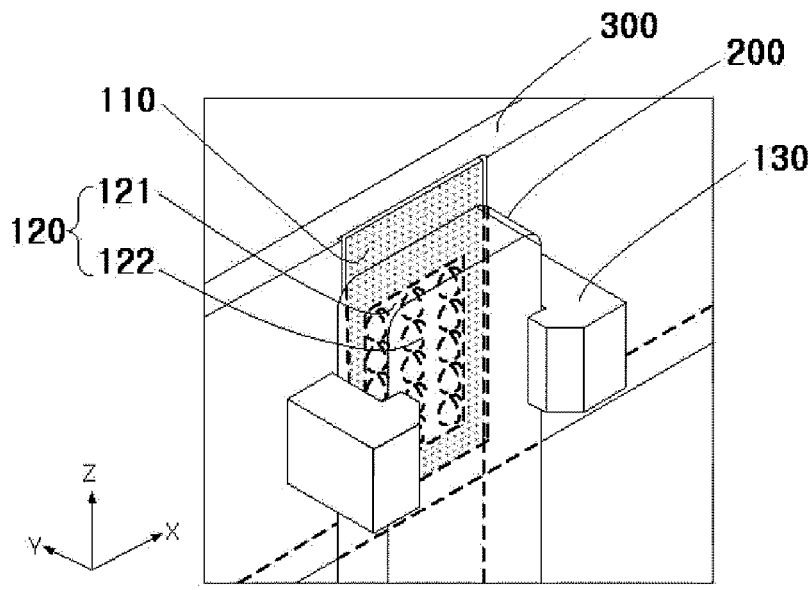

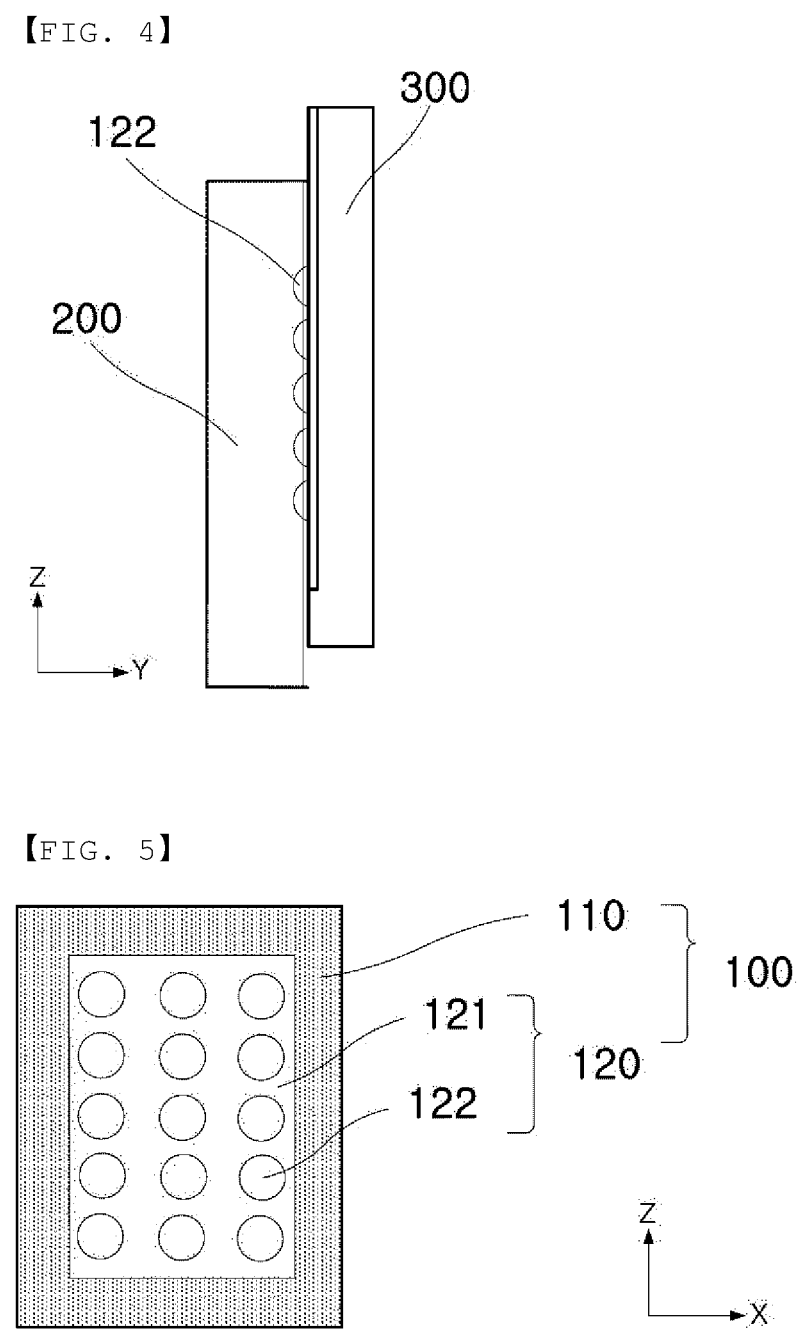

【FIG. 6】
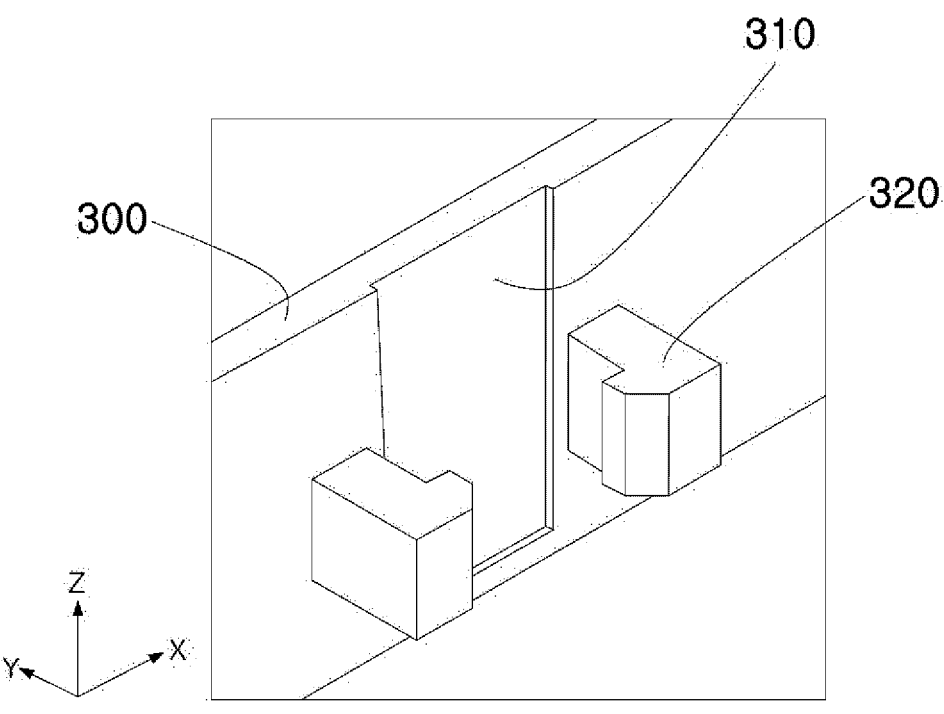
【FIG. 7】
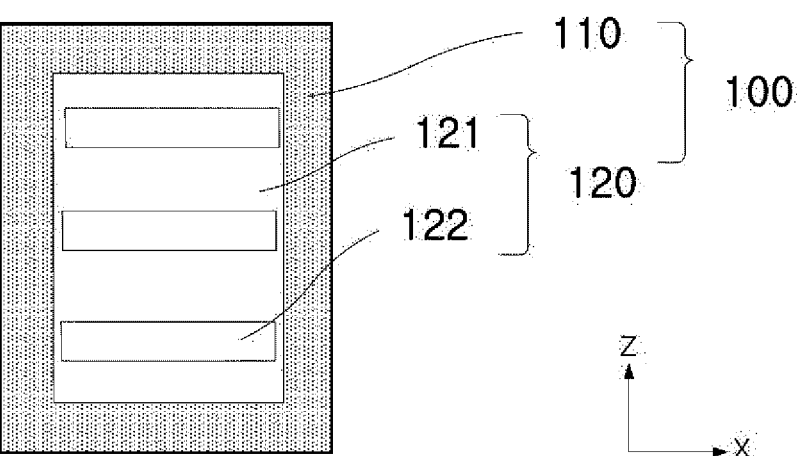

BATTERY MODULE SENSING UNIT AND MANUFACTURING METHOD THEREOF

CROSS-REFERENCE TO RELATED APPLICATION(S)

This application is a National Phase entry pursuant to 35 U.S.C. 371 of International Application PCT/KR2021/015003 filed on Oct. 25, 2021, and claims priority to and the benefit of priority to Korean Patent Application No. 2020-0139426 filed on Oct. 26, 2020, the disclosure of which is incorporated herein by reference in its entirety.

TECHNICAL FIELD

The present disclosure relates to a battery module sensing unit and a manufacturing method thereof, and more particularly to a battery module sensing unit having a simple structure in which a busbar and an FPCB are directly connected to each other and a manufacturing method thereof.

BACKGROUND ART

A battery module that is charged with power necessary to drive an electric motor is mounted in an environmentally friendly vehicle, such as an electric vehicle (EV) or a hybrid electric vehicle (HEV). A standard battery module standardized for common use of parts is mainly used in order to achieve slimming of the battery module and cost reduction thereof.

In the standard battery module, voltage of each battery cell constituting the battery module is measured in order to manage the battery cell. For example, a mechanical or electronic sensor is welded to each battery cell or is fastened to each battery cell in a clip fashion, a member configured to connect each battery cell and the voltage sensor to each other is mounted, and voltage of each battery cell is measured in order to control each battery cell. If the voltage of each battery cell is not measured, control of the battery cell is impossible. As a result, charging and discharging of the battery cell are not performed, whereby the battery cell does not function.

In the environmentally friendly vehicle, it is necessary to sense the voltage of a unit battery cell in order to prevent overcharging of the unit battery cell and to perform a voltage balancing function, etc.

A sensing unit configured to sense the voltage of the unit battery cell includes a sensing busbar and a flexible printed circuit board (hereinafter referred to as an "FPCB"), and a wire, a connector, etc. are necessary in order to achieve connection therebetween. That is, connection between the sensing busbar and the FPCB requires a complicated process, such as connecting, welding, or terminal pressing, and the sensing unit is manufactured using separate ancillary parts. In this case, the number of parts constituting the sensing unit is large, manufacturing cost is high, and the volume of the sensing unit is increased.

In connection therewith, FIG. 1 is a front view of a conventional battery module sensing unit, and FIG. 2 is a side view of the conventional battery module sensing unit.

Referring to FIGS. 1 and 2, the sensing unit includes an FPCB 10, a busbar 20, a busbar frame 30, and a sensing plate 40.

Here, the FPCB 10 is coupled to the sensing plate 40 through epoxy application, and the sensing plate 40 and the busbar 20 are connected to each other by welding.

In addition, the FPCB 10 and the sensing plate 40 are coupled to each other through epoxy application while extending along one side surface of each thereof. As a result, the overall length of the sensing unit is increased, whereby the structure of the sensing unit is complicated while the volume of the sensing unit is increased.

Meanwhile, Patent Document 1 discloses a sensing unit including an FPCB, a measurement main body including a busbar receiving compartment, a busbar, and a nut configured to fix the busbar and the measurement main body to each other.

In addition, Patent Document 2 discloses a sensing unit including a sensing housing coupled to a battery cell assembly having a cell busbar connected to each battery cell, a sensing busbar, a printed circuit board (hereinafter referred to as a "PCB"), and a curved shape-changed portion connected to the PCB, whereby the force of connection between busbars is increased.

Although both Patent Document 1 and Patent Document 2 provide a construction capable of simplifying the coupling structure of the sensing unit, a sensing unit configured such that the volume of the sensing unit is reduced and a manufacturing process thereof is simplified is not disclosed.

PRIOR ART DOCUMENTS (Patent Document 1) Japanese Patent Application Publication No. 2003-045409 (2003 Feb. 14)

(Patent Document 2) Korean Patent Application Publication No. 2018-0091325 (2018 Aug. 16)

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

The present disclosure has been made in view of the above problems, and it is an object of the present disclosure to provide a battery module sensing unit, the assembly structure of which is simple and the manufacturing process of which is simple, whereby cost is reduced, and a manufacturing method thereof.

It is another object of the present disclosure to provide a battery module sensing unit having a reduced volume, whereby surrounding space utilization efficiency is improved, and a manufacturing method thereof.

In order to accomplish the above objects, a battery module sensing unit according to the present disclosure includes a sensing member (120), an FPCB (100) including the sensing member (120), a busbar frame (300) connected to the FPCB (100), and a busbar (200) coupled to the busbar frame (300), wherein the FPCB (100) and the busbar (200) are directly coupled to each other while overlapping each other.

Also, in the battery module sensing unit according to the present disclosure, the sensing member (120) may be interposed between the FPCB (100) and the busbar (200) overlapping each other.

Also, in the battery module sensing unit according to the present disclosure, the busbar (200) may be directly connected to the sensing member (120) in tight contact therewith.

Also, in the battery module sensing unit according to the present disclosure, the sensing member (120) may have a projecting portion (122) formed thereon.

Also, in the battery module sensing unit according to the present disclosure, the busbar (200) may be brought into tight contact with the projecting portion (122).

Also, in the battery module sensing unit according to the present disclosure, the busbar frame (300) may be provided with a receiving portion (310) configured to allow the FPCB (100) to be mounted therein.

Also, in the battery module sensing unit according to the present disclosure, the receiving portion (310) may be configured to have a depressed structure in which the FPCB (100) is inserted into and seated in the receiving portion.

Also, in the battery module sensing unit according to the present disclosure, surfaces of the FPCB (100) and the receiving portion (310) that face each other may be attached to each other via an adhesive.

Also, in the battery module sensing unit according to the present disclosure, a hook (320) configured to fix the busbar (200) may be located at the busbar frame (300).

In addition, the present disclosure provides a battery module including the battery module sensing unit.

In addition, the present disclosure provides a battery pack including the battery module.

The present disclosure provides a battery module sensing unit manufacturing method including (a) forming a receiving portion (310) in a busbar frame (300), (b) disposing an FPCB (100) including a sensing member (120) in the receiving portion, and (c) coupling a busbar (200) to the busbar frame (300).

In addition, the battery module sensing unit manufacturing method according to the present disclosure may further include locating an adhesive on the surface of the receiving portion (310) between step (a) and step (b).

Also, in the present disclosure, one or more constructions that do not conflict with each other may be selected and combined from among the above constructions.

A battery module sensing unit according to the present disclosure and a manufacturing method thereof have an advantage in that an FPCB and a busbar constituting the battery module sensing unit may be connected to each other through simple assembly, whereby a manufacturing process may be simplified, and manufacturing time may be reduced.

In addition, the battery module sensing unit according to the present disclosure and the manufacturing method thereof have a merit in that, since the FPCB and the busbar are connected to each other in an overlapping state, an increase in volume of the battery module sensing unit may be minimized, and space utilization efficiency may be improved.

Furthermore, the battery module sensing unit according to the present disclosure and the manufacturing method thereof have a merit in that, since no conventional sensing plate needs to be used, the number of components may be reduced in the manufacturing process, whereby manufacturing cost may be reduced, and therefore economic improvement may be achieved.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

BRIEF DESCRIPTION OF DRAWINGS

The accompanying drawings, which are incorporated in and constitute a part of this specification, illustrate various exemplary embodiments and together with the description, serve to explain the principles of the disclosed embodiments.

FIG. 1 is a front view of a conventional battery module sensing unit.

FIG. 2 is a side view of the conventional battery module sensing unit.

FIG. 3 is a front view of a battery module sensing unit according to a first embodiment of the present disclosure.

FIG. 4 is a side view of the battery module sensing unit shown in FIG. 3.

FIG. 5 is a front view of a sensing member according to a first embodiment of the present disclosure.

FIG. 6 is a perspective view of a busbar frame according to a first embodiment of the present disclosure.

FIG. 7 is a front view of a sensing member according to a second embodiment of the present disclosure.

DETAILED DESCRIPTION

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module sensing unit according to the present disclosure will be described with reference to the accompanying drawings.

FIG. 3 is a front view of a battery module sensing unit according to a first embodiment of the present disclosure, FIG. 4 is a side view of the battery module sensing unit shown in FIG. 3, FIG. 5 is a front view of a sensing member according to a first embodiment of the present disclosure, and FIG. 6 is a perspective view of a busbar frame according to a first embodiment of the present disclosure.

Referring to FIGS. 3 to 6, the battery module sensing unit according to the first embodiment of the present disclosure includes a busbar frame 300, an FPCB 100 located at the busbar frame 300, a sensing member 120 located at the FPCB 100, and a busbar 200 coupled to the busbar frame 300.

First, when describing the busbar frame 300 in detail, the busbar frame 300 may be provided with a receiving portion 310 in which the FPCB 100 is seated. Specifically, the receiving portion 310 may have a receiving space in which the FPCB 100 is received and mounted at one side of the busbar frame 300.

It is preferable for the receiving portion to have a flat bottom surface. Although not shown in the figures, the FPCB 100 may be seated in the receiving portion 310, and an adhesion means, such as an adhesive or a double-sided tape, may be interposed between the bottom surface of the receiving portion 310 and the surface of the FPCB 100 that contacts the bottom surface of the receiving portion to prevent the FPCB 100 from being twisted in the receiving portion 310 or being separated from the receiving portion 310. In the case in which the bottom surface of the receiving portion 310 is flat, this is advantageous in increasing adhesive force of the FPCB 100.

Here, the adhesion means may be added to the entirety or a portion of the interface between the bottom surface of the receiving portion 310 and the FPCB 100. The adhesion means may be an electroconductive adhesive, and the electroconductive adhesive, which is an adhesive having conductivity and adhesiveness used instead of a conventional solder for joining of circuit wiring, may be classified as a normal temperature drying adhesive, a normal temperature curing adhesive, a thermosetting adhesive, a high temperature sintering adhesive, or a UV curing adhesive depending on the ingredient or nature thereof.

In addition, the depth of the receiving portion 310 to the bottom surface thereof may be equal to or less than the thickness from a projecting portion 122, a description of which will follow, to a substrate film 110, a description of which will follow, of the FPCB 100. The busbar frame 300 having the FPCB 100 mounted in the receiving portion 310 is coupled to the busbar 200, and the busbar 200 is electrically connected to the projecting portion 122 of the FPCB 100 in a tight contact therewith. Consequently, in the case in which the thickness from the projecting portion 122 of the FPCB 100, which is a thickest portion, to the substrate film 110 is greater than the depth of the receiving portion 310, the projecting portion 122 may be easily brought into tight contact with the busbar 200 located thereabove.

A coupling structure configured to couple the busbar 200, a description of which will follow, by fixing may be formed at the edge of the receiving portion 310. The coupling structure may be a coupling structure having various-sized hooks or a structure having a recess and a protrusion coupled to each other by fitting. The recess and the protrusion may constitute a sliding dovetail type structure. Coupling between the busbar 200 and the busbar frame 300 is not restricted as long as coupling therebetween is easily achieved.

Next, the FPCB 100 and the sensing member 120 will be described.

As shown in FIG. 5, the FPCB 100, which is located in the receiving portion 310 of the busbar frame 300, includes a substrate film 110 and a sensing member 120.

In the present disclosure, the FPCB 100 is configured such that a sensing sheet 121 on the substrate film 110 forms a circuit. Here, conductive printing ink may be densely printed on the substrate film 110, or a conductive film may be disposed on the substrate film 110, such that circuit wiring (not shown) is formed on the substrate film 110. The substrate film 110 may be transparent, semitransparent, or opaque. The substrate film may be made of a plastic material that exhibits transparency and flexibility or a synthetic resin that exhibit high-temperature resistance, such as polyethylene terephthalate (PET), polyimide (PI), or polyurethane (PU).

The sensing sheet 121 may be made of copper foil, and at least one spherical projecting portion 122 is formed from the copper foil by pressing, whereby the sensing member 120 is formed. As previously described, the projecting portion 122 is electrically connected to the busbar 200.

Here, it is preferable for the height of the projecting portion 122 to be greater than the depth of the receiving portion 310. By configuring the height of the projecting portion 122 to be greater than the depth of the receiving portion, the projecting portion is brought into surface contact with the busbar 200 located while overlapping the receiving portion, which is advantageous in achieving electrical coupling therebetween.

A reinforcement member (not shown) may be provided in the projecting portion 122, i.e. a space formed in the projecting portion so as to face the receiving portion 310 of the busbar frame 300. The reinforcement member is located in the space to prevent the projecting portion 122 from being deformed in a direction opposite a projecting direction thereof due to instantaneous tight contact pressure when the projecting portion 122 is brought into tight contact with the busbar 200, whereby smooth electrical connection between the FPCB 100 and the busbar 200 may be achieved. A UV adhesive or a silicone adhesive may be used as the reinforcement member, and a rubber-based or synthetic-resin-based solvent may be used.

Next, the busbar 200 will be described in detail.

In the present disclosure, the busbar 200 is approximately rectangular when viewed from above. The busbar 200 is formed by shaping a metal sheet to a predetermined shape using a pressing method. The busbar 200 may be made of a non-ferrous metal or a metal, such as copper, a copper alloy, or stainless steel (SUS). A tin or nickel plating layer may be formed on the surface of the busbar 200.

A method of manufacturing the battery module sensing unit according to the first embodiment of the present disclosure having the above construction may include (a) a step of forming a receiving portion 310 in a busbar frame 300, (b) a step of disposing an FPCB 100 including a sensing member 120 in the receiving portion, and (c) a step of coupling a busbar 200 to the busbar frame 300.

Also, in step (b), a sensing sheet 121 of the sensing member 120 is brought into tight contact with the bottom surface of the receiving portion 310, and a projecting portion 122 is disposed in tight contact with the busbar 200 while facing the busbar in a state of being spaced apart from the bottom surface by a predetermined distance.

Of course, a step of applying an adhesive may be performed before the step of disposing the FPCB 100 in the receiving portion 310 of the busbar frame 300.

FIG. 7 is a front view of a sensing member 120 according to a second embodiment of the present disclosure.

The second embodiment is identical to the first embodiment described with reference to FIGS. 3 to 6 except that the shape of a projecting portion is changed.

In the second embodiment of the present disclosure, a projecting portion 122 formed as the result of a sensing sheet 121 being pressed may have a long tunnel shape. The tunnel-shaped projecting portion 122 may be configured to have a plurality of connection points formed by a single straight line or a linear connection portion instead of one point between a busbar 200 and a hemispherical projecting portion. Consequently, electrical connection between the sensing member 120 and the busbar 200 is more effectively achieved.

The battery module sensing unit according to the present disclosure described above may be located in a battery module.

Here, the battery module may include a plurality of battery cells, which may be arranged so as to be stacked in at least one direction.

In addition, the battery cell may be a pouch-shaped battery cell. In particular, the pouch-shaped battery cell may include an electrode assembly, an electrolytic solution, and a pouch.

The electrode assembly is received in at least one receiving portion of the pouch, the edge of the receiving portion is fused, whereby the receiving portion is hermetically sealed, and a pair of electrode leads protrudes outwards from the pouch in a state of being connected to opposite sides or one side of the electrode assembly. Of course, positive electrode tabs and the negative electrode tabs of the electrode assembly may be electrically connected to each other, respectively, and may then be exposed outwards from the pouch. Alternatively, the electrode assembly and the electrode leads may be directly connected to each other without the tabs.

Meanwhile, the electrode assembly may be a jelly-roll type assembly, which is configured to have a structure in which a long sheet type positive electrode and a long sheet type negative electrode are wound in the state in which a separator is interposed therebetween, a stacked type assembly which is configured to have a structure in which a rectangular positive electrode and a rectangular negative electrode are stacked in the state in which a separator is interposed therebetween, a stacked and folded type assembly, which is configured to have a structure in which unit cells are wound using a long separation film, or a laminated and stacked type assembly, which is configured to have a structure in which battery cells are stacked and attached to each other in the state in which a separator is interposed therebetween. However, the present disclosure is not limited thereto.

Also, it is obvious that an electrolyte may be replaced by a solid electrolyte or a gel type quasi-solid electrolyte obtained by adding an additive to a solid electrolyte, the gel type quasi-solid electrolyte having an intermediate phase between a liquid and a solid, in addition to a liquid electrolyte, which is commonly used.

The electrode assembly is received in the receiving portion of the pouch, and the pouch is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability in order to hermetically seal the pouch from the outside, i.e. a thermally-bonded sealed portion between inner layers must exhibit excellent thermal bonding strength. The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present disclosure is not limited thereto, and polypropylene, which exhibits excellent mechanical-physical properties, such as tensile strength, rigidity, surface hardness, and impact resistance, and excellent chemical resistance, is the most preferably used.

The metal layer, which is disposed so as to abut the inner layer, corresponds to a barrier layer configured to prevent moisture or various kinds of gas from permeating into the battery from the outside. An aluminum thin film, which is light and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the electrode assembly. As an example, the outer layer may be made of nylon or polyethylene terephthalate. However, the present disclosure is not limited thereto.

In the battery module according to the present disclosure, the battery cell is not limited to the pouch-shaped battery cell, and various battery cells well-known at the time of filing the present application may be used.

In addition, the battery module comprising the battery module sensing unit may be used alone, or a plurality of battery modules may be assembled to constitute a battery pack. The battery module or the battery pack may be used in various devices, e.g. a vehicle, such as an electric vehicle or a hybrid electric vehicle.

Although the specific details of the present disclosure have been described in detail, those skilled in the art will appreciate that the detailed description thereof discloses only preferred embodiments of the present disclosure and thus does not limit the scope of the present disclosure. Accordingly, those skilled in the art will appreciate that various changes and modifications are possible, without departing from the category and technical idea of the present disclosure, and it will be obvious that such changes and modifications fall within the scope of the appended claims.

DESCRIPTION OF REFERENCE NUMERALS

10, 100: FPCBs
20, 200: Busbars
30, 300: Busbar frames
40: Sensing plate
110: Substrate film
120: Sensing member
121: Sensing sheet
122: Projecting portion
310: Receiving portion
320: Hook

INDUSTRIAL APPLICABILITY

A battery module sensing unit according to the present disclosure and a manufacturing method thereof have an advantage in that an FPCB and a busbar constituting the battery module sensing unit may be connected to each other through simple assembly, whereby a manufacturing process may be simplified, and manufacturing time may be reduced.

In addition, the battery module sensing unit according to the present disclosure and the manufacturing method thereof have a merit in that, since the FPCB and the busbar are connected to each other in an overlapping state, an increase in volume of the battery module sensing unit may be minimized, and space utilization efficiency may be improved.

Furthermore, the battery module sensing unit according to the present disclosure and the manufacturing method thereof have a merit in that, since no conventional sensing plate needs to be used, the number of components may be reduced in the manufacturing process, whereby manufacturing cost may be reduced, and therefore economic improvement may be achieved.

The invention claimed is:

1. A battery module sensing unit comprising:
a sensing member;
a flexible printed circuit board (FPCB) comprising the sensing member;
a busbar frame connected to the FPCB; and
a busbar coupled to the busbar frame, wherein a portion of the FPCB is coupled to the busbar, and
the sensing member is interposed between the portion of the FPCB and the busbar, and the sensing member is adjacent to the busbar.

2. The battery module sensing unit according to claim 1, wherein the busbar directly contacts the sensing member.

3. The battery module sensing unit according to claim 2, wherein the sensing member has a projecting portion formed thereon.

4. The battery module sensing unit according to claim 3, wherein the busbar contacts the projecting portion.

5. The battery module sensing unit according to claim 1, wherein the busbar frame includes a receiving portion configured to mount the FPCB therein.

6. The battery module sensing unit according to claim 5, wherein the receiving portion has a depressed structure in which the FPCB is inserted into and seated in the receiving portion.

7. The battery module sensing unit according to claim 5, wherein a surface of the FPCB and a portion of the receiving portion are attached to each other via an adhesive.

8. The battery module sensing unit according to claim 1, wherein a hook located at the busbar frame fixes the busbar.

9. A battery module comprising the battery module sensing unit according to claim 1.

10. A battery pack comprising the battery module according to claim 9.

11. A method of manufacturing a battery module sensing unit of claim 1, the method comprising the steps of:

(a) forming a receiving portion in a busbar frame;

(b) disposing a flexible printed circuit board (FPCB) comprising a sensing member in the receiving portion; and (c) coupling a busbar to the busbar frame such that the sensing member is adjacent to the busbar.

12. The battery module sensing unit manufacturing method according to claim 11, further comprising the step of:

applying an adhesive on a surface of the receiving portion between step (a) and step (b).

13. The battery module sensing unit manufacturing method according to claim 1, wherein in step (c), the busbar directly contacts the sensing member.

* * * * *